(No Model.) 2 Sheets—Sheet 1.

G. D. BURTON.
STOCK CAR.

No. 284,116. Patented Aug. 28, 1883.

WITNESSES
Fred A. Prick
John F. C. Prinster

INVENTOR
Geo. D. Burton (No Model.) 2 Sheets—Sheet 2.
G. D. BURTON
STOCK CAR.
No. 284,116. Patented Aug. 28, 1883.
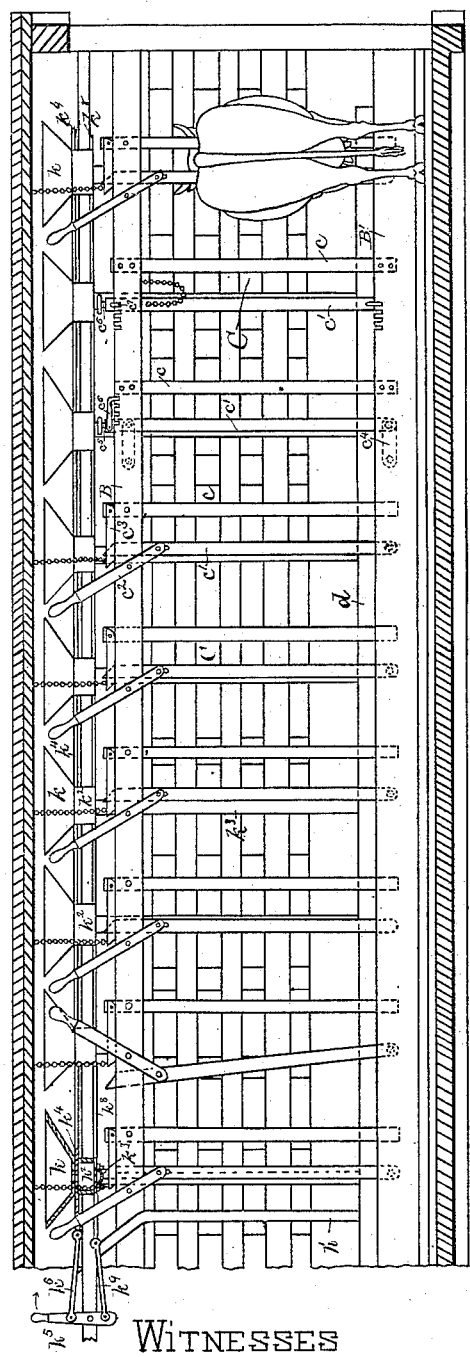
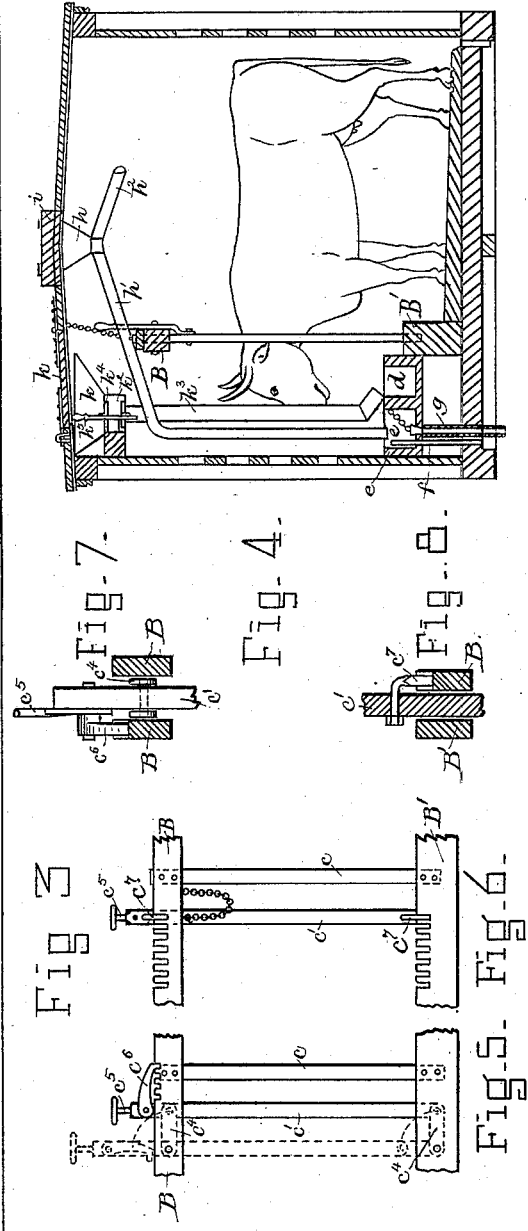
Witnesses
Fred A. Powell
John F. C. Pomerlert
Inventor
Geo. D. Burton
N. PETERS, Photo-Lithographer, Washington, D. C.

UNITED STATES PATENT OFFICE.

GEORGE D. BURTON, OF NEW IPSWICH, NEW HAMPSHIRE.

STOCK-CAR.

SPECIFICATION forming part of Letters Patent No. 284,116, dated August 28, 1883.

Application filed May 31, 1883. (No model.)

*To all whom it may concern:*

Be it known that I, GEORGE D. BURTON, of New Ipswich, county of Hillsborough, State of New Hampshire, have invented an Improvement in Stock-Cars, of which the following description, in connection with the accompanying drawings, is a specification, like letters on the drawings representing like parts.

My invention relates to stock-cars; and it consists in details of construction hereinafter described.

Figure 1:
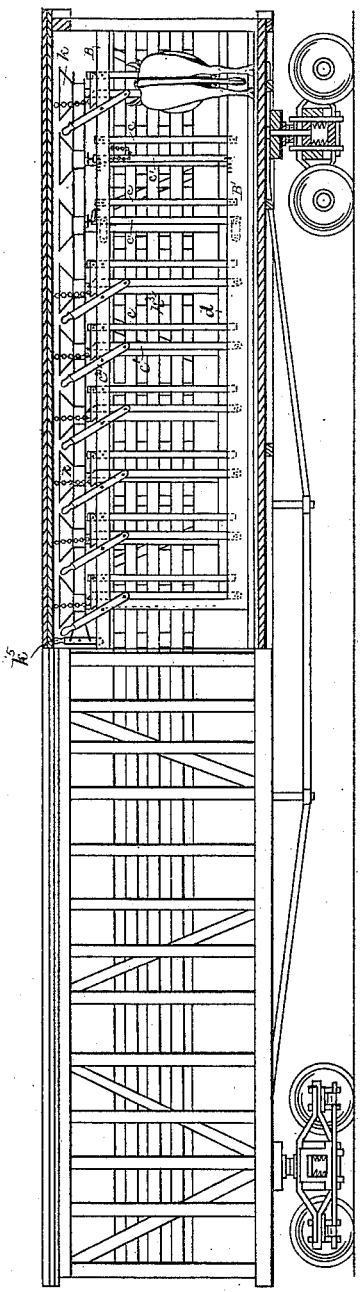
Figure 2:
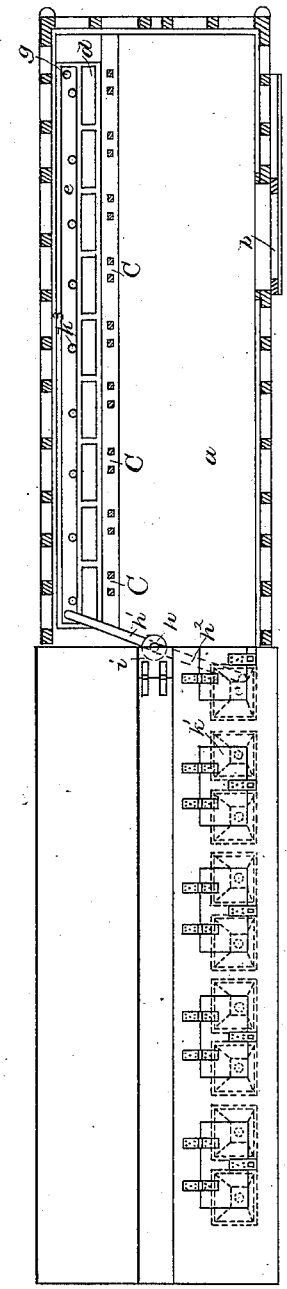

Figure 1 is a side elevation, partly in longitudinal section, of a stock-car constructed in accordance with this invention; Fig. 2, a plan view thereof, partly in horizontal section; Fig. 3, a longitudinal sectional elevation similar to that shown in Fig. 1, on a larger scale; Fig. 4 a cross-section near the middle of the car, on a larger scale; and Figs. 5, 6, 7, and 8, details of the novel stanchions employed.

The car-body $a$ is provided near each end with a door, $b$, for the admission of the cattle, the said doors being on opposite sides of the car. Opposite to each door $b$ the car is provided with a series of stock-fastening devices, (shown as cattle-stanchions C,) extending for substantially one-half the length of the car, and in front of the said stanchions is placed a feeding-trough, $d$, preferably having separate compartments, one to each stanchion, and in front of the said feeding-trough is a watering-trough, $e$, extending along near the side of the car, and provided with an overflow-pipe, $f$, (see Fig. 4,) and an emptying-pipe, $g$, having a suitable plug or stopper.

The two watering-troughs $e$ at the opposite sides and ends of the car may be supplied with water from a single inlet funnel or opening, $h$, covered by a door, $i$, at the middle of the car, and provided with branch pipes $h'$ $h^2$, leading diagonally across the car to the two troughs, as best shown in Figs. 2 and 4.

Corresponding to each stanchion and corresponding section of the feed-trough $d$ is a feed-receptacle, $k$, which may be filled through doors $k'$ at top of the car, each receptacle having beneath it a measuring-chamber, $k^2$, to contain sufficient material for a single meal, the said chamber being provided with a delivery-pipe, $k^3$, leading down to the different sections of the trough. The opening leading from the receptacle $k$ into the chamber $k^2$ is controlled by a valve, $k^4$, shown as composed of a board or strip of material extending through the entire series of feeding-receptacles, as shown in Fig. 3, and provided with a series of openings, which, by the longitudinal movement of the said valve-strip produced by the lever $k^5$, connected therewith by the link or bar $k^6$, will move all the said openings into coincidence with that in the bottom of the receptacle $k$, as shown at the left hand in Fig. 3, thus permitting the measuring-chambers $k^2$ to fill, the upper ends of the pipes $k^3$ being then closed by a similar valve-strip, $k^8$, connected by a link, $k^9$, with the said lever $k^5$ at the other side of its fulcrum. Both valves $k^4$ and $k^8$ are operated simultaneously by the movement of the lever $k^5$ in the direction of the arrow, Fig. 4, the said movement being made by an attendant upon the top of the car through one of the doors therein, and the said movement closing the passages from the receptacle $k$ and opening those from the chambers $k^2$ into the pipe $k^3$, thus permitting the said chamber to discharge sufficient food for one meal into the trough below.

Most of the stanchions C are shown as consisting of a stationary upright, $c$, and a movable upright, $c'$, pivoted at its lower end and operated by a lever, $c^2$, to swing its upper end away from the stationary upright, to permit the horns of the cattle to pass between the said uprights, after which the movable upright $c'$ is returned to its normal position, where it is held by a locking device, $c^3$, preventing the cattle from withdrawing their heads.

In some sections of the country the cattle have larger horns than in others, and the necks of some cattle are so much thicker than those of others that when the uprights of the stanchions are placed at the average distance apart they would uncomfortably compress the necks of the said cattle.

In order to provide for different sizes of cattle, the whole or a sufficient portion of the stanchions may be made as in Figs. 5 and 7 or as in Figs. 6 and 8. In this construction the movable upright $c'$, instead of having its lower end pivoted at a definite distance from the stationary upright and swinging with relation thereto at its upper end, is arranged to have a parallel movement toward and from the said stationary upright. As shown in Figs. 5 and 7, the movable upright $c'$ is connected at its upper and lower ends by links $c^4$ with the frame-work, and it is provided at its upper end with a handle, $c^5$, by which it may be lifted, and thus moved away from the stationary upright, as shown in dotted lines. After the horns and heads of the cattle have been passed between the uprights, the said movable upright $c$ is permitted to move back until it comes sufficiently near to the stationary upright $c$, when it is held and prevented from moving laterally in either direction by a dog, $c^6$, entering the proper one of a series of notches in the transverse beam B, which supports the upper ends of the stanchions. As shown in Figs. 6 and 8, the movable upright $c'$ is provided with locking-fingers $c^7$, entering corresponding-spaced notches in the upper and lower beams, B B', the said upright being raised by its handle $c^5$ to disengage the fingers $c^7$ from the notches, after which the upright may be moved laterally as desired, and finally dropped with the fingers in the proper notches to give the requisite width between the stanchions.

I claim—

In a stock-car, a cattle-stanchion consisting of a fixed upright combined with a movable upright, having a lateral movement at both ends relative to the said fixed upright, and a locking device therefor, and the supporting-beam provided with a series of notches co-operating with the said locking device, substantially as described.

In testimony whereof I have signed my name to this specification in the presence of two subscribing witnesses.

GEO. D. BURTON.

Witnesses:
E. F. PERKINS,
W. H. SIGSTON.